United States Patent
Christodoulides et al.

(10) Patent No.: US 6,466,712 B1
(45) Date of Patent: Oct. 15, 2002

(54) OPTICAL TRANSMISSION LINK INCORPORATING HIGHPASS OPTICAL FILTERING

(75) Inventors: Demetrios Nicolau Christodoulides, Allentown, PA (US); Jean-Marc Pierre Delavaux, Franklin Township, Hunterdon County, NJ (US); Christopher Michael McIntosh, Bethlehem, PA (US); Jean Toulouse, Bethlehem, PA (US)

(73) Assignees: Lucent Technologies Inc., Murray Hill, NJ (US); Lehigh University, Bethlehem, PA (US)

( * ) Notice: Subject to any disclaimer, the term of this patent is extended or adjusted under 35 U.S.C. 154(b) by 51 days.

(21) Appl. No.: 09/642,378

(22) Filed: Aug. 21, 2000

(51) Int. Cl.[7] ................................................. G02B 6/28
(52) U.S. Cl. ..................... 385/24; 359/161; 359/341.1; 359/337.2
(58) Field of Search ........................... 385/24; 359/161, 359/341.1, 337.2

(56) References Cited

U.S. PATENT DOCUMENTS

| | | | | |
|---|---|---|---|---|
| 5,107,360 A | * | 4/1992 | Huber | 359/124 |
| 5,131,069 A | * | 7/1992 | Hall | 385/123 |
| 5,777,793 A | * | 7/1998 | Little | 359/127 |
| 6,094,296 A | * | 7/2000 | Kosaka | 359/124 |
| 6,181,465 B1 | * | 1/2001 | Grubb | 359/341 |
| 6,327,062 B1 | * | 12/2001 | King | 359/124 |

* cited by examiner

Primary Examiner—Cassandra Spyrou
Assistant Examiner—Leo Boutsikaris
(74) Attorney, Agent, or Firm—Wendy W. Koba, Esq.

(57) ABSTRACT

An optical fiber transmission link with reduced channel depletion due to stimulated Raman scattering is formed by including a high pass optical filter in the transmission fiber. The filter may comprise one or more discrete components, or may be formed as a "distributed" filter along the length of the optical fiber. The cut-off frequency for the high pass optical filter is selected to be immediately below the frequency of the input channel to be transmitted. When used in an arrangement with multiple input channels, the cut-off frequency is controlled to be immediately below the lowest input channel frequency.

18 Claims, 5 Drawing Sheets

OPTICAL TRANSMISSION LINK INCORPORATING HIGHPASS OPTICAL FILTERING

TECHNICAL FIELD

The present invention relates to optical fiber transmission links and, more particularly, to the such links as used in WDM optical transmission systems.

BACKGROUND OF THE INVENTION

Stimulated Raman scattering (SRS) is one of the major nonlinear optical processes that can impair the performance of optical fiber transmission links. SRS causes energy exchange between light components of different frequencies propagating in a medium such as an optical fiber.

One impact of SRS on wavelength-division-multiplexed (WDM) transmission links is known as SRS crosstalk, in which energy is transferred from at least one channel of higher frequency to at least one channel of lower frequency. In principle, SRS crosstalk can be eliminated via spectral inversion techniques.

Another impact of SRS on both single and multiple channel transmission links is referred to as channel depletion. Channel depletion occurs because any "optical noise" present in the transmission link will be amplified by the channels via SRS. The origins of the optical noise may be side modes of the channels or the optical noise created by spontaneous Raman scattering of the channels. The amount of noise amplification depends on the frequency shift of the optical noise away from the channels and on the channel powers. In fused silica fibers, the maximum noise amplification occurs roughly 13 THz away from the channels. For example, a channel with a wavelength of 1550 nm will amplify optical noise preferentially around ~1660 nm. In a transmission link with high aggregate channel power (such as in a massive WDM link), the noise amplification can be large enough to cause significant channel depletion. Thus, a need remains in the art for overcoming the problems associated with optical noise in optical transmission inks.

SUMMARY OF THE INVENTION

The need remaining in the prior art is addressed by the present invention, which relates to optical transmission links and, more particularly, to the inclusion of one or more high pass optical filters in the transmission link to reduce the channel depletion due to stimulated Raman scattering (SRS).

In accordance with the present invention, a high pass optical filter is included in the optical transmission link, where the filter exhibits a cut-off frequency substantially immediately below the channel frequency, with low loss at this frequency and high loss at the unwanted optical noise frequencies. In arrangements utilizing multiple input channels, the high pass filter is configured to exhibit a cut-off frequency immediately below the lowest channel frequency. The resultant high loss at Raman noise frequencies will lead to reduced interactions of the optical noise with the channels, thus permitting greater channel power to reach the end of the optical fiber. Thus, the channel depletion due to SRS is reduced.

In one embodiment, the high pass filter may comprise a discrete element, such as a fused silica coupler, a dielectric stack, or long period Bragg gratings. Multiple filters may be utilized in order to reduce noise interaction along the length of the fiber.

In an alternative embodiment, the high pass filter may be of the "distributed" type, achieved by inserting absorbing ions into the core of the transmission fiber, or placing an absorbing layer around the core of the fiber.

BRIEF DESCRIPTION OF THE DRAWINGS

Referring now to the drawings.

DETAILED DESCRIPTION

Figure 1:
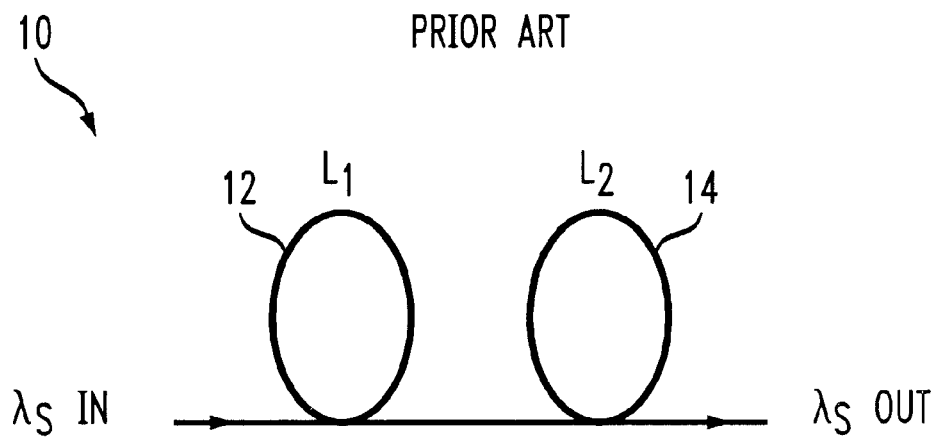
FIG. 1 illustrates an exemplary prior art fiber optic transmission link.

FIG. 1 illustrates an exemplary prior art optical transmission link 10. As shown, an input channel S at a predetermined wavelength $\lambda_S$ (for example, 1550 nm) is applied as an input to a first length of single mode optical fiber 12. It is to be noted that various other conventional prior art arrangements may use a plurality of separate input channels. The arrangement of FIG. 1 illustrates only one channel for the sake of clarity. Referring back to FIG. 1, the transmission region itself comprises two sections of fiber, denoted 12 and 14. The length of first section 12 is denoted as $L_1$ and the length of second section 14 is denoted as $L_2$. The channel S will be attenuated by the sections of optical fiber and then appear as an output from second fiber 14.

Figure 2:
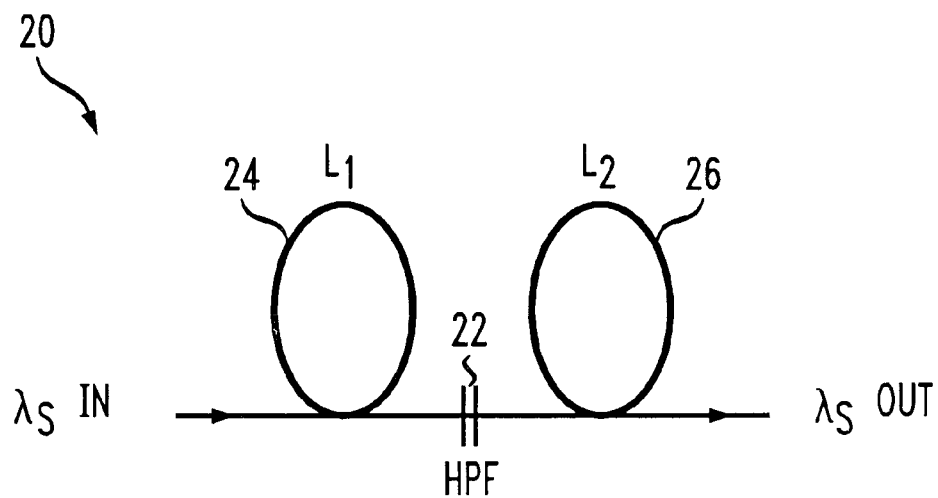
FIG. 2 illustrates a first embodiment of an optical fiber transmission link formed in accordance with the present invention, including a high pass optical filter disposed between two sections of system fiber.

In accordance with the present invention, the output channel power can be significantly improved by including a high pass optical filter (with a cut-off frequency immediately below the channel frequency) in the optical transmission link of FIG. 1. FIG. 2 illustrates an exemplary optical transmission link 20 formed in accordance with the present invention to include a high pass optical filter 22 in the channel path between a first fiber section 24 and a second fiber section 26. The location of high pass filter 22 may be optimized (in terms of increase of output channel power) by varying the ratio of $L_1/L_2$ of fiber sections 24 and 26, respectively. As with the prior art arrangement, for this embodiment of the present invention, at least one channel S is applied as an input to the optical transmission link 20. The output channel S will exit transmission link 20 at the end of optical fiber 26. In accordance with the present invention, the cut-off frequency of filter 22 is set immediately below that of the lowest frequency channel and will therefore pass the input channel(s) with low loss while severely attenuating the unwanted optical noise components. In one embodiment, high pass filter 22 may comprise a fused silica coupler. Alternatively, a stacked dielectric structure may be used to form filter 22. In another embodiment, high pass filter 22 may comprise a long period Bragg grating. In general, any suitable arrangement capable of forming an optical high pass filter may be used.

Figure 3:
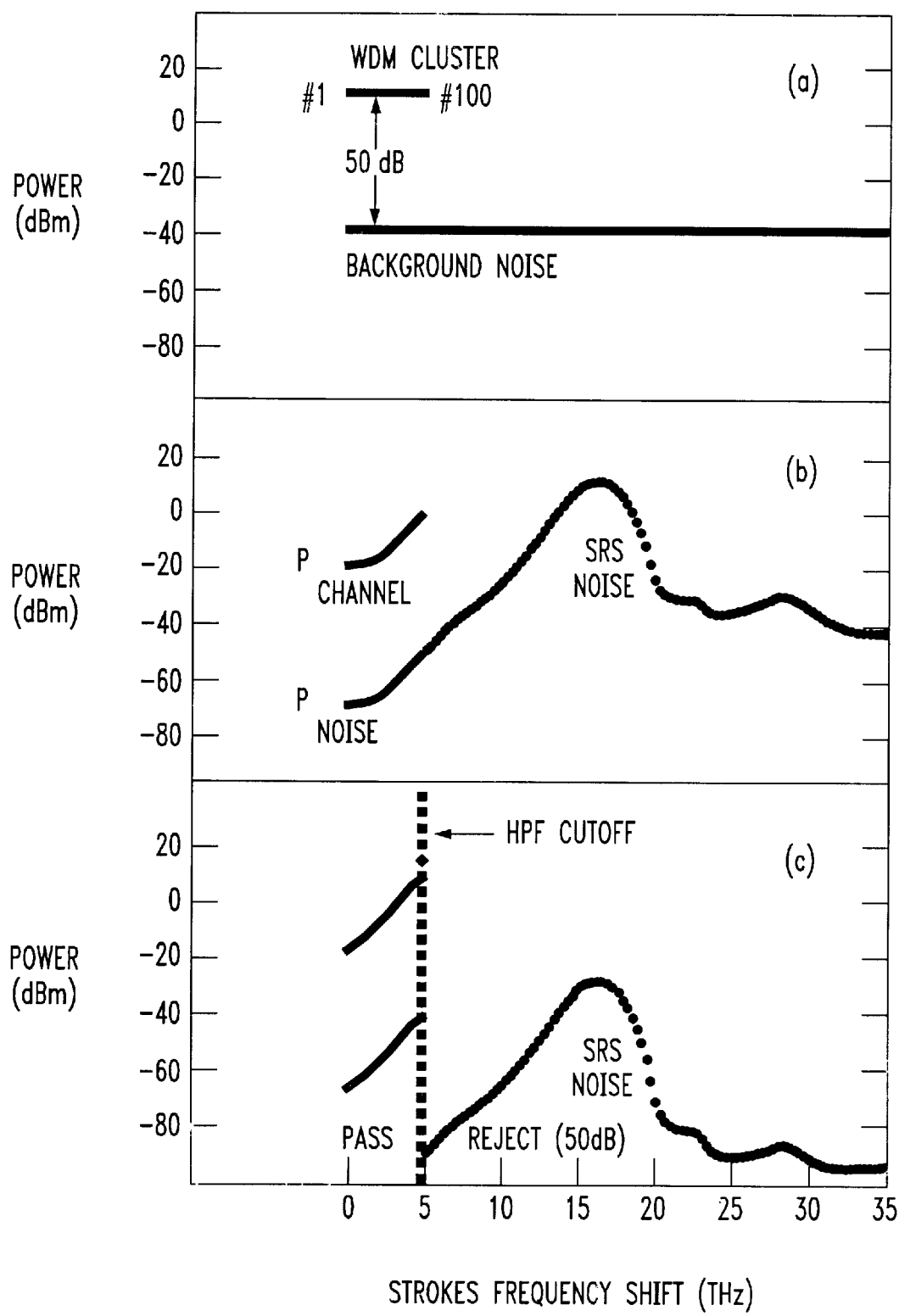
FIG. 3 is a simulation plot of the evolution of stimulated Raman scattering (SRS) noise along the length of the transmission link in a prior art arrangement (such as shown in FIG. 1) and in an arrangement of the present invention (such as shown in FIG. 2), when 100 channels with 15 mW power are injected into the fiber.

FIG. 3 is composed of three simulation plots which contrast the SRS penalties introduced by the prior art transmission link, such as in FIG. 1, versus the transmission link of the present invention, such as in FIG. 2. In the simulations, 100 channels, spaced by 50 GHz, are co-injected into an optical fiber. A flat noise background accompanies these channels. This noise may arise from several sources, including spontaneous Raman scattering, amplified spontaneous emission from optical amplifiers, side modes from laser sources etc. For simulation purposes, the continuous noise background has been discretized. Every such discrete component is assumed to carry a power $S_{ND}\Delta f$, where $S_{ND}$ is a spectral noise density and $\Delta f$ is the frequency range that this component represents. In the simulations, a noise interval $\Delta f$ equal to 300 GHz was used. The power in every noise component is taken here to be 50 dB below the power in each channel. This level of noise is comparable to that which may be expected from $S_{ND}=h\nu$ (one photon per mode rule). The channels and noise components interact according to the SRS coupled intensity equations. In the simulations, the input power is the same in all the channels. The wavelength of channel #1 (the highest frequency channel) is taken to be 1500 nm while channel #100 (the lowest frequency channel) is at 1538 nm. However, the results of this simulation apply to a WDM system at any wavelength, since Raman scattering depends only on the frequency difference between the light components involved. For simplicity, backward and spontaneous scattering have been neglected. The parameters of the fiber optic system were taken to be L=50 km, $\alpha$=0.2 dB/km and $A_{eff}$=50 $\mu m^2$. The high-frequency pass filter (HPF), intended to suppress channel depletion due to lower frequency noise, has a 50 dB rejection ratio for all frequencies below its cut-off. In accordance with the present invention, the cut-off frequency of the HPF is chosen to be immediately below the frequency of channel #100 (lowest frequency channel). In a preferred embodiment using a 50 km fiber link, a HPF of the present invention is inserted after the first 10 km of the 50 km fiber transmission link. The initial (z=0) power distribution for the WDM channels is shown in FIG. 3(*a*) together with the noise background. Each channel carries 15 mW (+11.76 dBm) of power and thus a total of 1.5 W is injected into the fiber. The frequency of channel #1 is referenced to a shift of 0 THz, with longer wavelengths corresponding to higher Stokes frequency shifts. FIG. 3(*b*) depicts the power distribution at the output of the 50 km optical fiber when no filter is used, such as in the prior art transmission link in FIG. 1. In addition to the 10 dB (0.2 dB/km×50 km) of linear attenuation, it is clear from this figure that, due to SRS, considerable power is lost from the WDM cluster to the background noise. In this example, the power loss permits the background noise to rise well above the SRS threshold, which is defined as the power at which the total channel power equals the total noise power at the fiber output. It is also the case that the WDM channels experience considerable SRS crosstalk, which leads to power tilt between channels. FIG. 3(*c*), in contrast, illustrates the output power distribution of a WDM system with a high-frequency pass filter (HPF) inserted after the first 10 km of the fiber, such as in the arrangement illustrated in FIG. 2. In comparison to FIG. 3(*b*), the growth of noise from SRS has been significantly suppressed by the HPF, thus essentially eliminating the SRS channel depletion. However, in this case, the power tilt among the channels has increased, since more power has remained in the WDM cluster.

Figure 4:
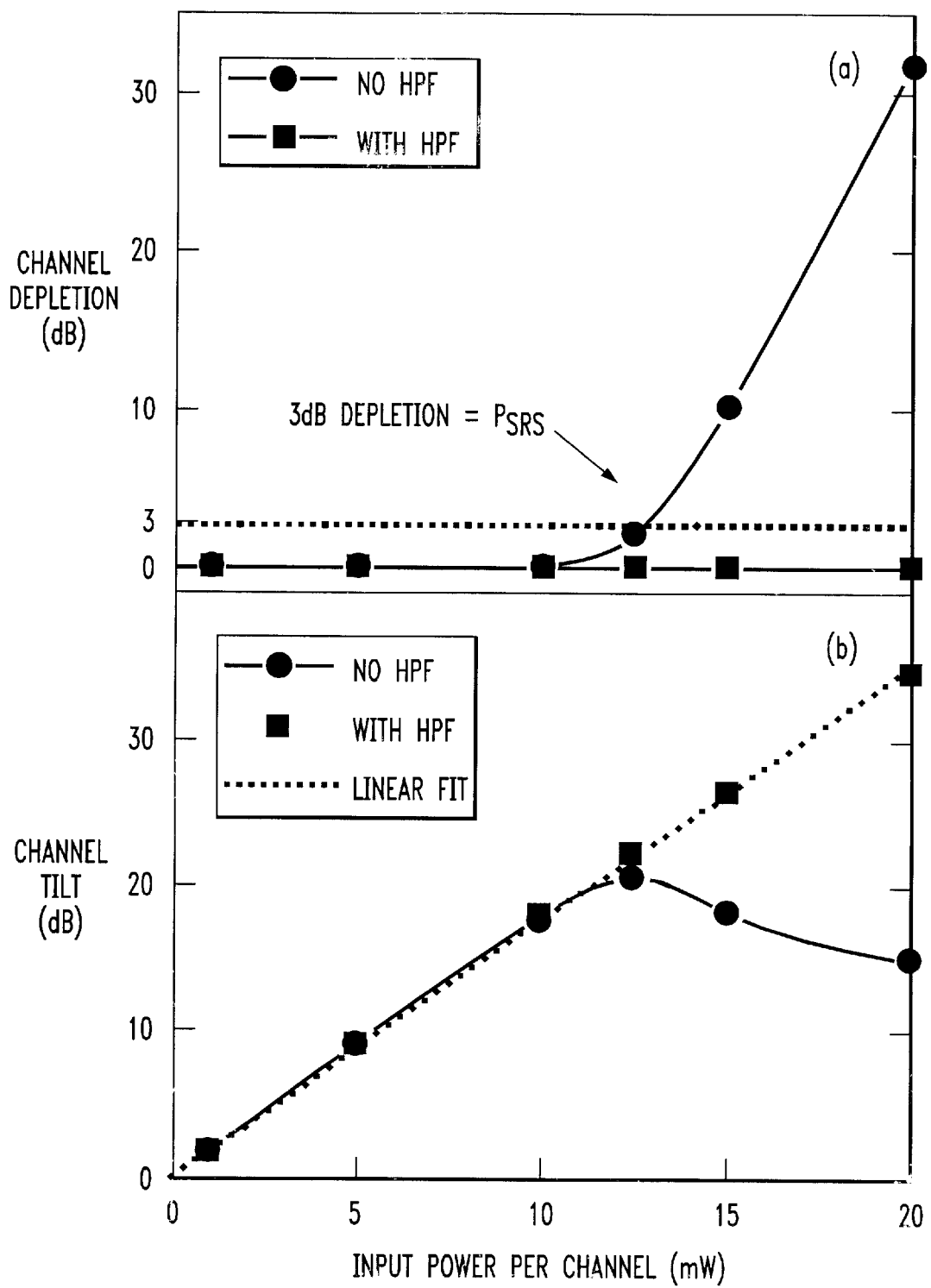
FIG. 4 is a simulation plot of the channel tilt and channel depletion as a function of the input power pen channel, as in the arrangements of FIG. 3.
Figure 5:
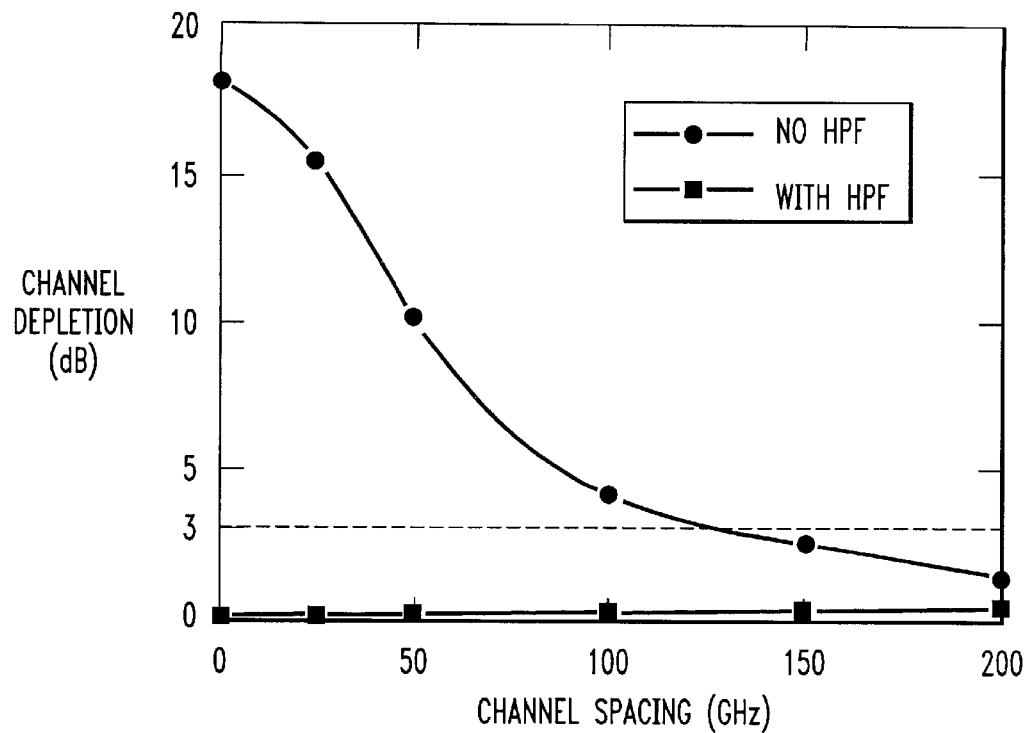
FIG. 5 is a simulation plot of the channel depletion as a function of the channel frequency spacing, as in the arrangements of FIG. 3.

To better understand the dependence of the SRS channel depletion on the input channel power, a new set of numerical simulations has been performed with and without a HPF inserted at 10 km. Apart from the input channel power, all parameters have remained the same as in FIG. 3 above. FIG. 4(*a*) shows the power dependence of the channel depletion. The channel depletion is calculated by determining the average additional loss (above the 10 dB of linear attenuation) incurred by the WDM system due to the creation of SRS noise. In the absence of a filter, the channel depletion rises quickly beyond the 3 dB level (SRS threshold) for channel powers above 13 mW. Once a HPF is inserted, the channel depletion is essentially eliminated (0.15 dB at 20 mW per channel). The channel tilt at the fiber output is shown in FIG. 4(*b*) as a function of the input channel power. In the presence of the HPF, the channel tilt follows a linear relation with the input channel power. The linear dependence of the channel tilt on the input channel power is broken when the HPF is removed from the system because of significant noise amplification due to SRS. As mentioned above, this channel tilt may be eliminated via spectral inversion techniques.

Further simulations have been performed to investigate the dependence of the channel depletion on the channel frequency. The input channel power is fixed at 15 mW. First, when the HPF is not in the system, the channel depletion decreases with the channel spacing. However, even for 200 GHz spacing, the depletion remains above 1.25 dB. On the other hand, if a 50 dB HPF is introduced after 10 km as taught by the present invention, the channel depletion remains below 0.25 dB for the range of $\Delta f$=0 to 200 GHz.

Figure 6:
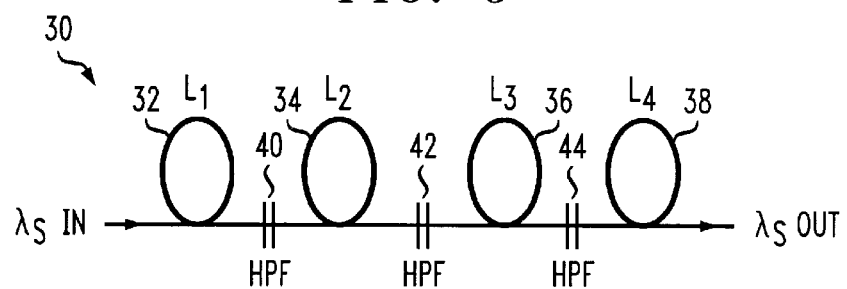
FIG. 6 illustrates an alternative embodiment of the present invention, including a set of three high pass filters distributed along the length of the transmission link.

FIG. 6 illustrates an alternative embodiment 30 of the present invention utilizing a plurality of separate high pass optical filters distributed along the transmission fiber. In this particular embodiment, the input channel S (at a predetermined wavelength $\lambda_S$) is applied as an input to a first optical fiber 32. The fiber transmission link portion comprises four fiber sections 32, 34, 36 and 38, disposed as shown in FIG. 6. A set of three high pass optical filters is included in this particular embodiment, with a first filter 40 disposed between fiber sections 32 and 34, a second filter 42 disposed between fiber sections 34 and 36, and a third filter 44 disposed between fiber sections 36 and 38. As an alternative to disposing a plurality of discrete filters along the length of the fiber transmission link, a "distributed" filter arrangement can be used. For example, absorbing ions may be inserted into the core of the transmission fiber itself to filter out the unwanted optical noise. In another embodiment, a layer of optically absorbing material may be disposed to surround the core of the fiber and used to filter out the noise. In general, any arrangement capable of providing the required high pass optical filtering may be used and is considered to fall within the spirit and scope of the present invention.

Figure 7:
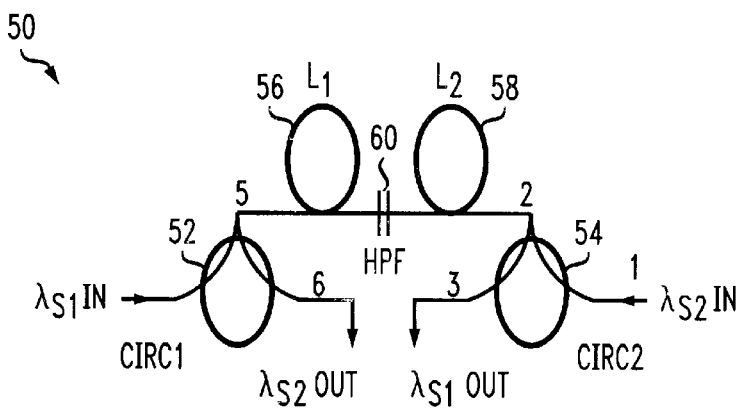
FIG. 7 is yet another embodiment of the present invention, utilizing bi-directional transmission and high pass filtering.

FIG. 7 illustrates an embodiment 50 of the present invention capable of bi-directional transmission. As shown, a first at least one input channel S1 at a predetermined wavelength $\lambda_{S1}$ is applied as an input to a first circulator 52. A second at least one input channel S2 at a predetermined wavelength $\lambda_{S2}$ is applied as an input to a second circulator 54. Other coupling arrangements may be used, where a circulator is considered to be exemplary only (and considered as "preferred" in the sense that a circulator provides both multiplexing and isolation). The transmission region itself comprises two sections of fiber, denoted 56 and 58. In accordance with the present invention, a high pass optical filter 60 is disposed between fiber sections 56 and 58. The channels S1 and S2 will travel through the sections of optical fiber 56 and 58 and the optical filter 60. Channel(s) S1 will then appear as an output from second circulator 54 while channel(s) S2 will appear as an output from first circulator 52.

Figure 8:
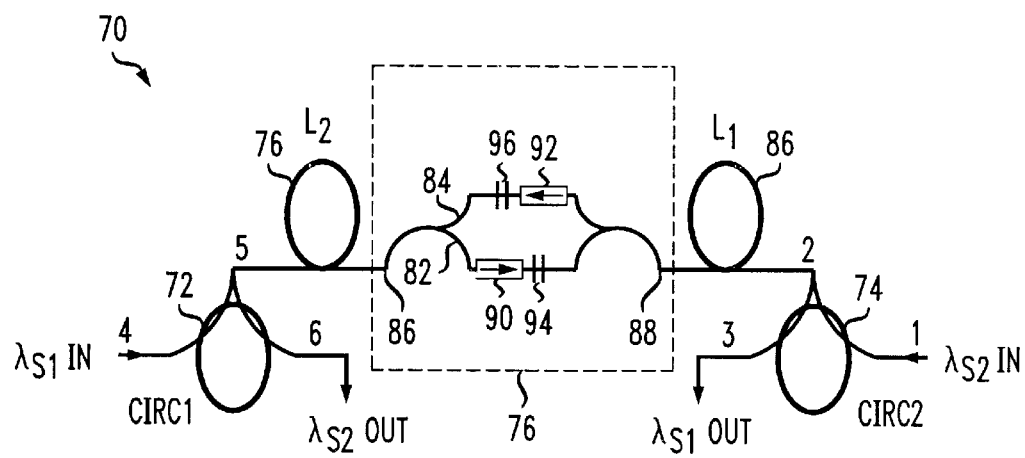
FIG. 8 illustrates an embodiment of the present invention which utilizes bi-directional transmission, mid-stage isolation and high pass filtering.

FIG. 8 illustrates an embodiment 70 of the present invention capable of bi-directional transmission which utilizes a "mid-stage" isolator incorporating a high pass filter. As shown, a first channel S1 is applied as an input to a first circulator 72 and a second channel S2 as an input to a second circulator 74. A mid-stage isolator arrangement 76 is disposed between a first fiber section 78 and a second fiber section 80, where isolator arrangement 76 permits the counter-propagating channels S1 and S2 to travel through two separate paths 82 and 84, by means of a pair of wavelength division multiplexers 86 and 88, as shown. An optical isolator 90 is included in path 82 associated with channel S1 to prevent reflected portions of channel S1, as well as optical noise, from propagating in the reverse direction. An optical isolator 92 is also included in path 84 associated with channel S2 to prevent reflected portions of channel S2, as well as optical noise, from propagating in the reverse direction. By using separate paths for channels S1 and S2, neither channel is attenuated by isolators 90 and 92, where the isolation then only reduces the optical noise traveling in opposite directions along the channels. As shown, a first high pass optical filter 94 of the present invention is disposed in path 82 with isolator 90 and thus provides the desired filtering to the input channel S1 so as to remove the optical noise components. A second high pass optical filter 96 of the present invention is disposed in path 84 with isolator 92, also filtering the unwanted noise components. In an alternative embodiment, a single high pass filter may be disposed in the common transmission path of channels S1 and S2 in place of filters 94 and 96. The location of isolator arrangement 76 also may be optimized (in terms of increase in channel output power) by varying the ratio of $L_1/L_2$.

Figure 9:
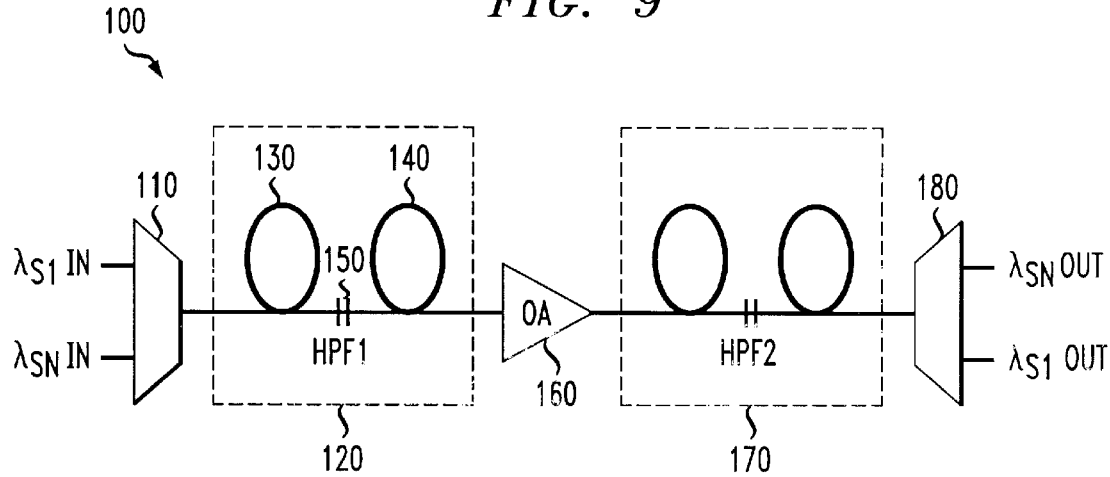
FIG. 9 is a diagram of an exemplary optical communication system utilizing a plurality of concatenated transmission links in accordance with the present invention and at least one optical amplifier.

There are various types of optical transmission systems that require amplification of the transmitted optical channel, where at least one optical amplifier may be disposed with at least optical transmission link of the present invention. For example, long haul optical systems may require a plurality of optical amplifiers disposed at predetermined locations between the transmission links to prevent unacceptable levels of attenuation within the system. FIG. 9 illustrates, in simplified block diagram form, an exemplary long-haul optical transmission system 100 which uses optical transmission links of the present invention. As shown, a plurality of input channels $S_1$–$S_N$, operating at associated channel wavelengths $\lambda_1$–$\lambda_N$, are applied as inputs to a wavelength division multiplexer 110 that functions to multiplex this plurality of input channels onto an optical transmission link 120 of the present invention. This exemplary optical transmission link consists of two sections of optical fiber 130 and 140. A high pass optical filter 150 is disposed between first section 130 and second section 140. As with the arrangements discussed above, the cut-off frequency of high pass filter 150 is chosen to be immediately below the lowest channel frequency of the plurality of frequencies associated with wavelengths $\lambda_1$–$\lambda_N$. In general, any of the various embodiments of an optical fiber transmission link utilizing a high pass filter in accordance with the present invention may be used to form transmission link 120. The optical channels propagating through optical transmission link 120 become sufficiently attenuated such that amplification is required. After optical amplifier 160 provides the required amplification, the amplified optical channels propagate along a second optical transmission link 170. In general, any desired number of fiber spans and optical amplifiers may be used before the plurality of channels reaches its destination, in this example, a wavelength division demultiplexer 180, which functions to separate out the plurality of transmitted channels $S_1$–$S_N$ along a plurality of separate receive channel paths.

What is claimed is:

1. An optical fiber transmission link comprising
    a section of single mode fiber;
    an arrangement for coupling at least one input optical channel to the section of single mode fiber; and
    a high pass optical filter exhibiting a cut-off frequency substantially immediately below that of the lowest frequency input channel, said high pass filter disposed along said section of single mode fiber, wherein low frequency optical noise components are filtered out and channel depletion due to stimulated Raman scattering is reduced.

2. An optical fiber transmission link as defined in claim 1 wherein the at least one input channel comprises a single input channel.

3. An optical fiber transmission link as defined in claim 1 wherein the at least one input channel comprises a plurality of input channels, each operating at a different frequency with the high pass filter exhibiting a cut-off frequency substantially immediately below the lowest input channel frequency.

4. An optical fiber transmission link as defined in claim 1 wherein the high pass optical filter comprises a discrete optical filtering arrangement.

5. An optical fiber transmission link as defined in claim 4 wherein the discrete optical filtering arrangement comprises a plurality of separate optical filters disposed along the length of the single mode fiber.

6. An optical fiber transmission link as defined in claim 4 wherein the discrete optical filtering arrangement comprises a single high pass optical filter disposed at a predetermined location along the section of single mode fiber.

7. An optical fiber transmission link as defined in claim 4 wherein the discrete optical filtering arrangement comprises a fused silica optical coupler.

8. An optical fiber transmission link as defined in claim 4 wherein the discrete optical filtering arrangement comprises a stacked dielectric device.

9. An optical fiber transmission link as defined in claim 4 wherein the discrete optical filtering arrangement comprises a long period Bragg grating.

10. An optical fiber transmission link as defined in claim 1 wherein the optical filtering arrangement comprises a distributed optical filter.

11. An optical fiber transmission link as defined in claim 10 wherein the distributed optical filter comprises a layer of absorbing material disposed around the core of the single mode fiber.

12. An optical fiber transmission link as defined in claim 10 wherein the distributed optical filter comprises absorbing ions disposed in the core of the single mode fiber.

13. An optical transmission system comprising an optical transmitter for providing at least one input optical channel at a predetermined wavelength $\lambda_s$ and an optical receiver for receiving said at least one input optical channel, with an optical channel path disposed between said optical transmitter and said optical receiver, said optical channel path including at least one section of single mode fiber, said optical transmission system further comprising

- a first arrangement for coupling said least one input optical channel from said optical channel path to the section of single mode fiber;
- a high pass optical filter exhibiting a cut-off frequency immediately below that of the lowest frequency input channel, said high pass filter disposed along said section of single mode fiber, wherein low frequency optical noise components are filtered out and channel depletion due to stimulated Raman scattering is reduced.

14. An optical transmission system as defined in claim 13 wherein the system comprises a plurality of transmission links separated by at least one optical amplifier disposed in series along the optical channel path.

15. An optical transmission system as defined in claim 13 wherein the transmission link comprises a plurality of separate optical channels from a plurality of separate sources and a wavelength division multiplexer for combining the plurality of separate channels and coupling the plurality of separate channels onto the optical channel path.

16. An optical transmission system as defined in claim 13 wherein the optical receiver is responsive to a plurality of separate optical channels and includes a wavelength division demultiplexer for separating the plurality of channels and distributing the plurality of channels onto separate output channel paths.

17. An optical transmission system as defined in claim 13 wherein at least one optical amplifier comprises a remotely pumped fiber amplifier.

18. An optical transmission system as defined in claim 13 wherein the system is "bi-directional".

* * * * *